Jan. 11, 1927.  L. S. BESSONETT  1,613,739

DRAINAGE FITTING FOR OIL RESERVOIRS

Filed Jan. 27, 1925

Inventor
Leland S. Bessonett
By Lyon & Lyon
Attorneys

Patented Jan. 11, 1927.

1,613,739

UNITED STATES PATENT OFFICE.

LELAND S. BESSONETT, OF SAN FRANCISCO, CALIFORNIA, ASSIGNOR, BY MESNE ASSIGNMENTS, TO STANDARD OIL COMPANY OF CALIFORNIA, OF SAN FRANCISCO, CALIFORNIA, A CORPORATION OF DELAWARE.

DRAINAGE FITTING FOR OIL RESERVOIRS.

Application filed January 27, 1925. Serial No. 5,179.

This invention relates to drainage fittings for oil reservoirs, and is more particularly directed to a drainage fitting adapted to be installed between a lubricant container and the original oil suction flange as provided by the manufacturer of a common type motor vehicle engine.

An object of this invention is to provide a drainage fitting adapted to be connected or attached to the lubricant reservoir of a motor vehicle at or near its lowest point.

An object of this invention is to provide a fitting adapted to be connected or attached to the lubricant reservoir of a motor vehicle engine in connection with the original oil suction flange provided in a common type of motor vehicle engine.

An object of this invention is to provide a fitting adapted to be attached to the lubricant reservoir of a motor vehicle engine that will not materially decrease the road clearance thereof.

An object of this invention is to provide a fitting of the above enumerated characteristics such that its installation will not interfere with the functioning of any part of the system of the motor vehicle to which it is attached.

An object of this invention is to provide a fitting adapted to be attached to the lubricant reservoir of a motor vehicle engine at or near its lowest point, and of such simple construction that the same may be installed by inexperienced persons and at the same time not produce additional liability to oil leakage.

Other objects and advantages of this invention will be apparent from the following detailed description of a preferred embodiment thereof illustrated in the accompanying drawings.

Figure 1:
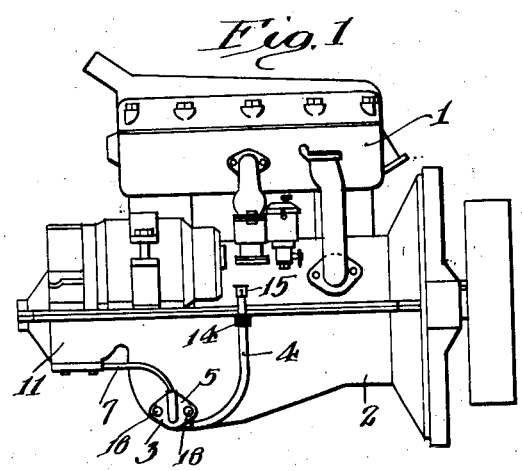
Fig. 1 is a side elevation of a motor vehicle engine of an ordinary type, illustrating a drainage fitting embodying this invention attached thereto.
Figure 2:
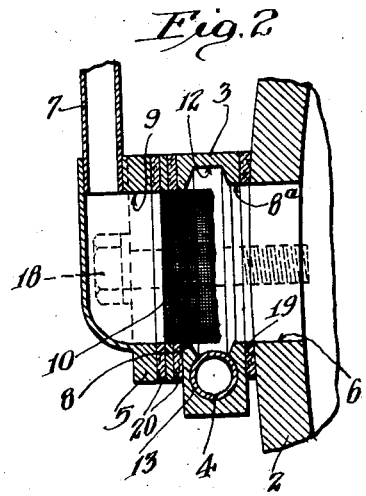
Fig. 2 is a central sectional end elevation of the fitting illustrated in Fig. 1, illustrating the same attached to a fragment of the oil reservoir between the original oil suction flange and the said reservoir.
Figure 3:
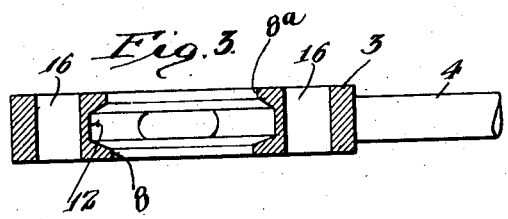
Fig. 3 is a sectional plan view of the fitting illustrated in Fig. 2 embodying this invention.
Figure 4:
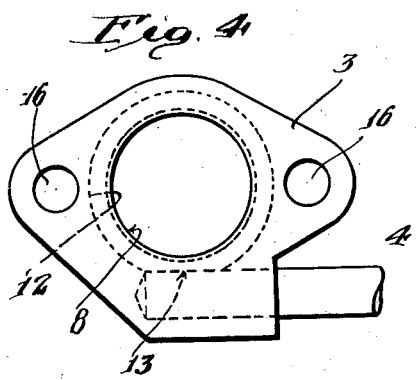
Fig. 4 is a front elevation of the fitting illustrated in Fig. 3.
Figure 5:
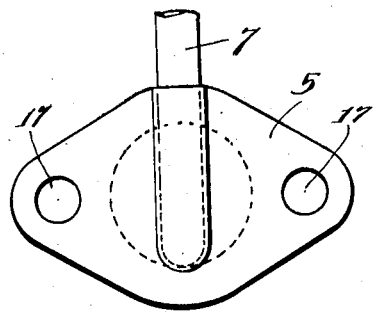
Fig. 5 is a front elevation of the original oil suction flange.

In the drawings, 1 indicates a motor vehicle engine of a common type in which the oil reservoir is in the lowest point of the oil reservoir is in the crank case 2; a fitting 3 is attached thereto for connecting a discharge or eduction tube 4 in fluid tight relation with the lowest point of the said crank case 2, so that oil may be discharged or withdrawn from the oil reservoir by any suitable means, such as that illustrated in the copending application of Henry D. Collier for system and apparatus for discharging lubricant from motor vehicles, filed February 9, 1924, Serial No. 691,861.

The fitting 3 is of such construction as to be readily disposed between the original oil suction flange 5 and the said lowest point of the crank case 2 so as to allow communication from the port 6 of the crank case, either through the discharge tube 4 or through the suction tube 7. The circular opening 8 of the fitting 3 is preferably of proper size and location to register accurately with the original opening 9 in the oil suction flange 5 when the same is in place, and the cylindrical opening 8 is of such size as to permit insertion of the original oil strainer 10 between the flange 5 and the fitting 3 so that the oil drawn into the suction tube 7 will be thoroughly strained before the same is led through the tube 7 into the gear box 11 or other point of delivery. The opening 8ª, which is adapted to register with the oil outlet 6, is preferably of the same diameter as the opening 6.

Located between the cylindrical openings 8—8ª and concentric with the said holes, is an annular groove 12, which communicates at its lower point with a bottom groove or sump 13 which extends from the annular groove 12 to the outside of the fitting 3.

The discharge tube 4 is welded, brazed, or otherwise permanently secured to the fitting 3 at the end of the groove 13, to provide a leakproof joint, and the said tube 4, being of malleable metal, is then bent upward to the proper position to be inserted within the clamp 14 so that the same may be readily and securely held in position, it being important that the upper end 15 of the tube 4 be at a point above the normal level of the oil in the crank case, or oil reservoir 2.

The fitting 3 is bored as illustrated at 16 to register with the bores 17 of the suction flange 5 so that the same may be rigidly secured to the crank case by means of cap screws 18 passed therethrough. 19 illustrates packing rings of any suitable construction positioned between the fitting 3 and the side of the crank case 2. 20 illustrates a pair of packing rings or gaskets of any suitable construction positioned upon the opposite sides of the strainer 10 so as to provide a fluid tight connection between the fitting 3 and the suction flange 5.

Having fully described a preferred embodiment of the invention, it is to be understood that it is not intended to limit the same to the exact construction herein set forth, which may obviously be varied in detail without departing from the spirit of the appended claims.

I claim:

1. The combination, with a lubricant-containing case having an outlet and a suction discharge flange, and a suction inlet attached to the flange, of a fitting adapted to be interposed between said flange and said case and having an opening freely communicating with said outlet, said fitting having a chamber open at its side and a discharge tube open to free communication with said chamber.

2. The combination, with a lubricant-containing case having an outlet and a suction discharge flange adapted to be positioned over said outlet, and a suction inlet attached to the flange, of a fitting adapted to be interposed between said flange and said opening in fluid tight relation, and a discharge tube connected thereby to said opening so as to permit unrestricted flow of lubricant through said tube.

3. The combination, with a lubricant-containing case having an outlet substantially at the lowest point of said case, and a suction discharge flange having a suction inlet attached to the flange, of a discharge fitting having a central annular chamber adapted to be interposed between said flange and said case in fluid tight relation, said chamber being open at its side to communicate with said outlet and said discharge flange, and a discharge tubing secured to said fitting in communication with said chamber.

4. The combination, with a lubricant-containing case having an outlet and a suction discharge flange having a suction inlet attached thereto, of a discharge fitting adapted to be interposed between said flange and said case and having a lubricant chamber, open at its side to communicate with said outlet and said flange, a second chamber or sump below the first said chamber, and a discharge tube secured to said fitting in communication with said sump.

5. The combination, with a lubricant-containing case having an outlet and a suction discharge flange having a suction inlet attached thereto, of a discharge fitting adapted to be interposed between said flange and said case in fluid tight relation, said fitting having a chamber, openings from said chamber to said outlet and to said flange wherein a means is interposed between said flange and said fitting for clarifying the lubricant, and a discharge tube secured to said fitting and communicating with said chamber.

6. The combination, with a lubricant containing case having an outlet, and a suction discharge flange having a suction inlet attached thereto, of a fitting adapted to be interposed between said flange and said case and providing means for connecting a discharge tube to said outlet in fluid tight relation and permitting a free flow of fluid from said case into said tube.

7. The combination, with a lubricant containing case having an outlet and a suction discharge flange having a suction inlet attached thereto, of a fitting adapted to be interposed between said flange and said case to provide means for connecting a discharge tubing in open communication with said outlet, said fitting having an annular chamber.

Signed at San Francisco, Calif., this seventeenth day of January, 1925.

LELAND S. BESSONETT.